United States Patent
Li et al.

(10) Patent No.: US 11,653,338 B2
(45) Date of Patent: May 16, 2023

(54) GUARD SYMBOLS (NG) TABLES GENERATION FOR CO-LOCATED IAB DU/MT RESOURCE TRANSITION

(71) Applicant: Intel Corporation, Santa Clara, CA (US)

(72) Inventors: Qian Li, Beaverton, OR (US); Lili Wei, Portland, OR (US); Geng Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 187 days.

(21) Appl. No.: 17/090,425

(22) Filed: Nov. 5, 2020

(65) Prior Publication Data

US 2021/0058926 A1    Feb. 25, 2021

Related U.S. Application Data

(60) Provisional application No. 62/933,133, filed on Nov. 8, 2019.

(51) Int. Cl.
*H04W 72/04* (2009.01)
*H04L 27/26* (2006.01)
*H04W 72/0446* (2023.01)

(52) U.S. Cl.
CPC ..... *H04W 72/0446* (2013.01); *H04L 27/2666* (2013.01)

(58) Field of Classification Search
CPC .......... H04W 72/0446; H04L 27/2666; H04L 27/26025; H04L 5/0032; H04L 5/0062; H04L 5/0091; H04L 27/2605; H04L 27/2646
See application file for complete search history.

(56) References Cited

U.S. PATENT DOCUMENTS 11,516,063 B2 * 11/2022 You ..................... H04L 27/2666
2020/0248399 A1 * 8/2020 Ohara ................. D06M 15/564

FOREIGN PATENT DOCUMENTS

WO    WO-2020202190 A1 * 10/2020
WO    WO-2022150008 A1 *  7/2022

OTHER PUBLICATIONS

3rd Generation Partnership Project; Technical Specification Group Radio Access Network; NR; Physical layer procedures for control, Dec. 2019, 3GPP TS 38.213 (Year: 2019).*

* cited by examiner

*Primary Examiner* — Tejis Daya
(74) *Attorney, Agent, or Firm* — Schwegman Lundberg & Woessner, P.A.

(57) ABSTRACT

To configure an IAB node for DU function and MT function resource transitions within an IAB network, the processing circuitry is to detect using allocated resources, a plurality of resource transitions in adjacent slots between transmission or reception of data on a parent backhaul link. The processing circuitry determines based on sub-carrier spacing (SCS) associated with the allocated resources, a guard symbol table with a number of desired guard symbols for each of the plurality of resource transitions. The number of desired guard symbols are for insertion during the transmission or reception of the data on the parent backhaul link to avoid overlapping of the allocated resources for the parent backhaul link and allocated resources for the DU function during the plurality of resource transitions.

20 Claims, 7 Drawing Sheets

GUARD SYMBOLS (NG) TABLES GENERATION FOR CO-LOCATED IAB DU/MT RESOURCE TRANSITION

PRIORITY CLAIM

This application claims the benefit of priority under 35 U.S.C. 119(e) to the U.S. Provisional Patent Application Ser. No. 62/933,133, filed Nov. 8, 2019, and entitled "METHODS TO GENERATE NG TABLES FOR CO-LOCATED IAB DU/MT RESOURCE TRANSITION," which provisional patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for guard symbols (Ng) tables generation for co-located integrated access and backhaul (IAB) distributed unit (DU) and mobile termination (MT) resource transition.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques for guard symbols (Ng) tables generation for co-located IAB DU and MT resource transition.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
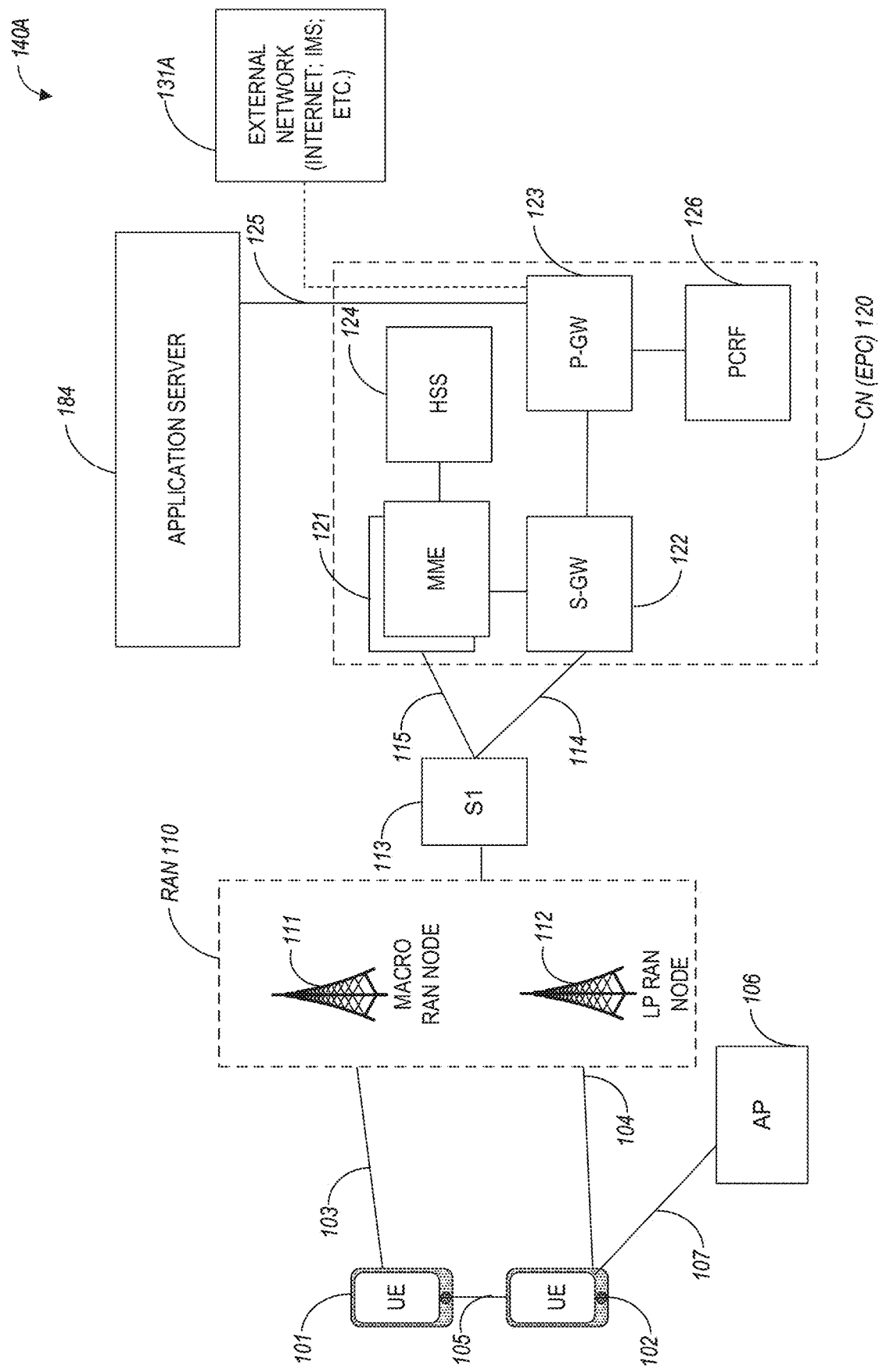
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-IC). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018 December). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
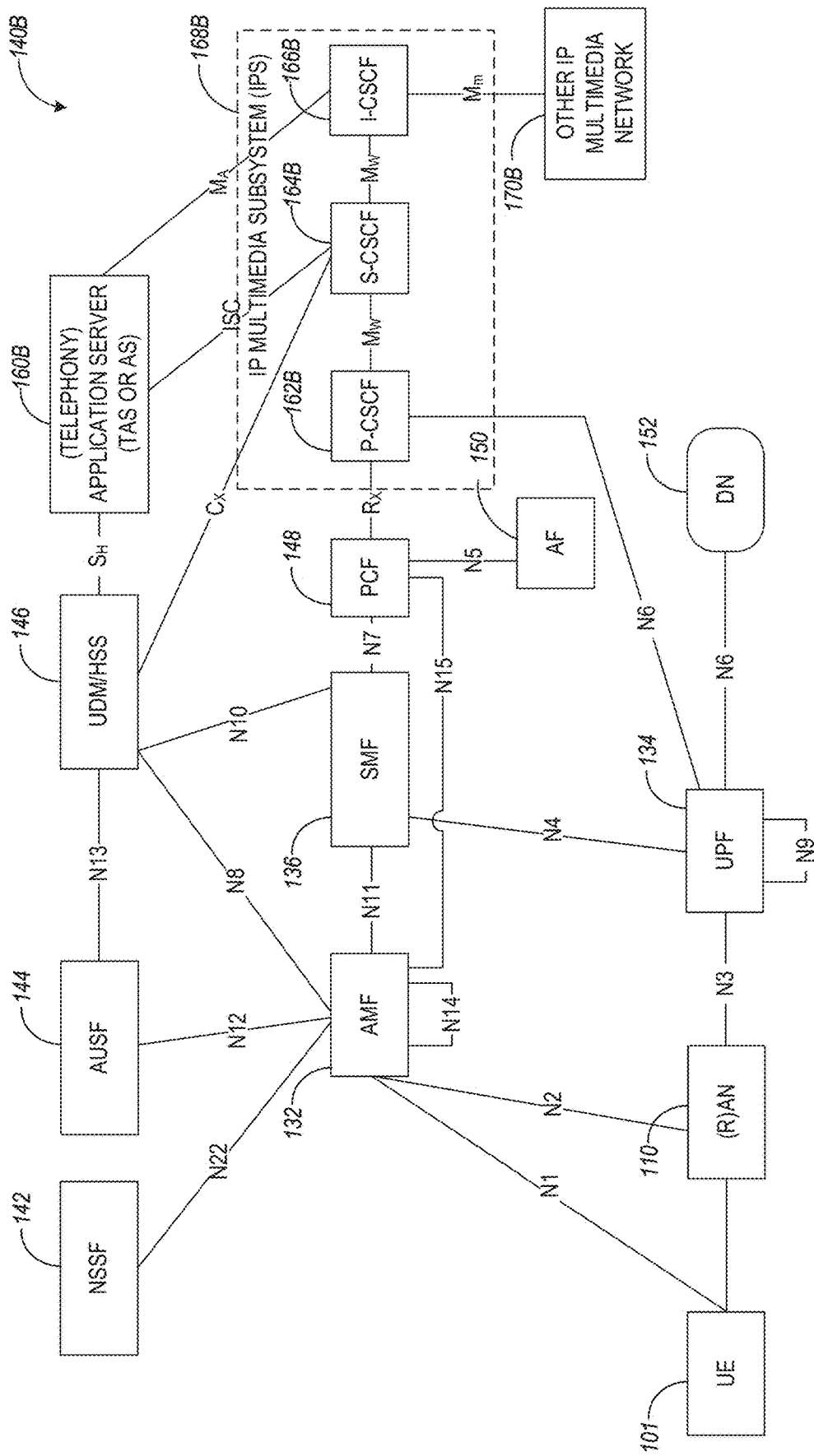
FIG. 1B and FIG. 1C illustrate a non-roaming 5G system architecture in accordance with some aspects.

FIG. 1B illustrates a non-roaming 5G system architecture in accordance with some aspects. Referring to FIG. B, there is illustrated a 5G system architecture 140B in a reference point representation. More specifically. UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown). N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
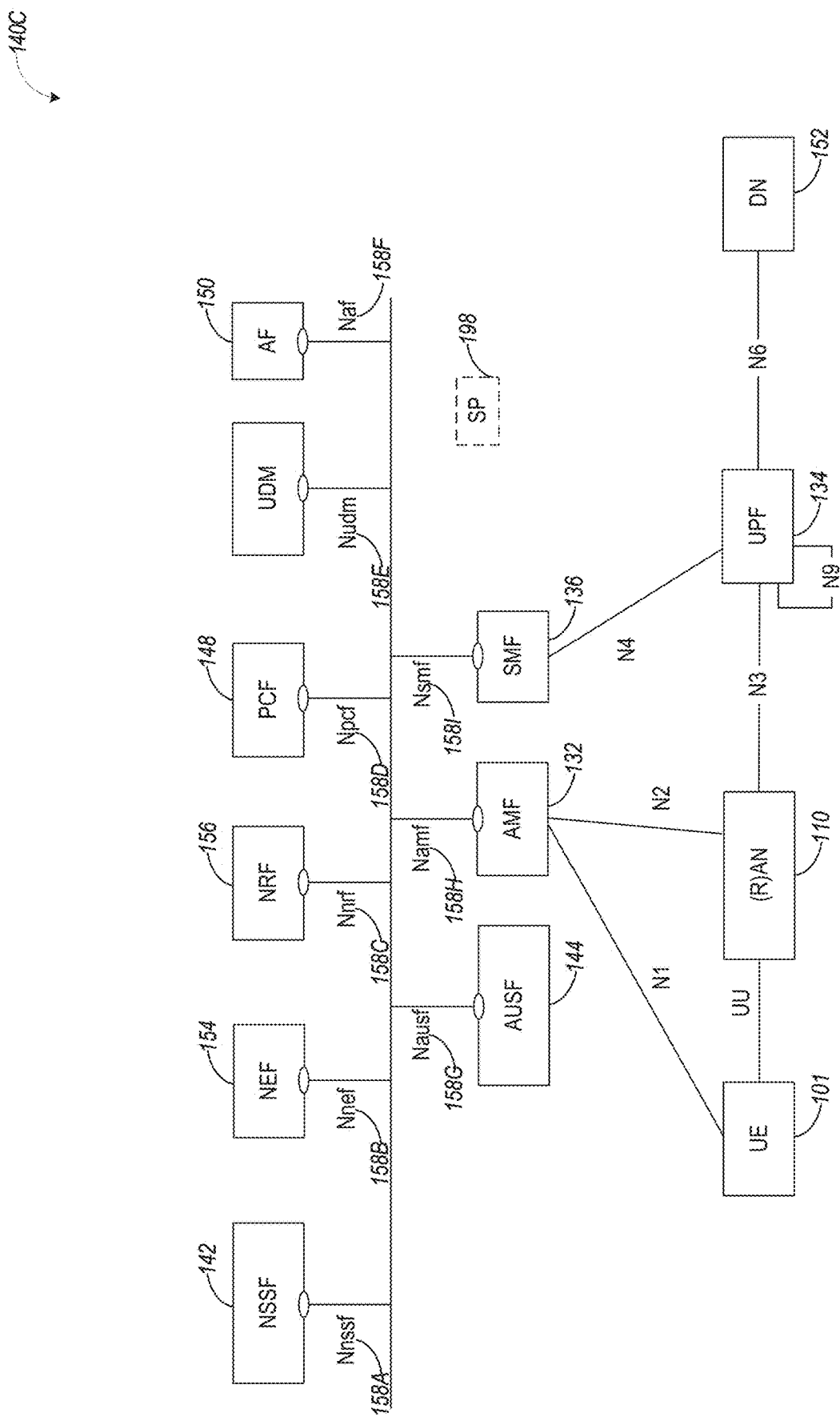

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Techniques discussed herein can be performed by a UE, a base station (e.g., any of the UEs or base stations discussed in connection with FIG. 1A-FIG. 1C), or any of the nodes in the Integrated Access and Backhaul (IAB) communication systems discussed in connection with FIGS. 2-5.

For an IAB node, the IAB distributed unit (DU) function may operate with multiple cells by using multiple component carriers (CCs) and/or multiple antenna panels. On the other hand, the co-located IAB mobile termination (MT) function can work under different CCs with carrier aggregation for a backhaul link. In some aspects, the IAB donor node central unit (CU) function and the parent node can be aware of the multiplexing capability between the MT and the DU functions (e.g., time-division multiplexing (TDM) is required or TDM is not required) of an IAB node for any {MT CC, DU cell} pair. Techniques discussed herein use signaling contents, signaling mechanisms, and detailed signaling methods to communicate an IAB node's multiplexing capability to the donor CU and the parent node.

Figure 2:
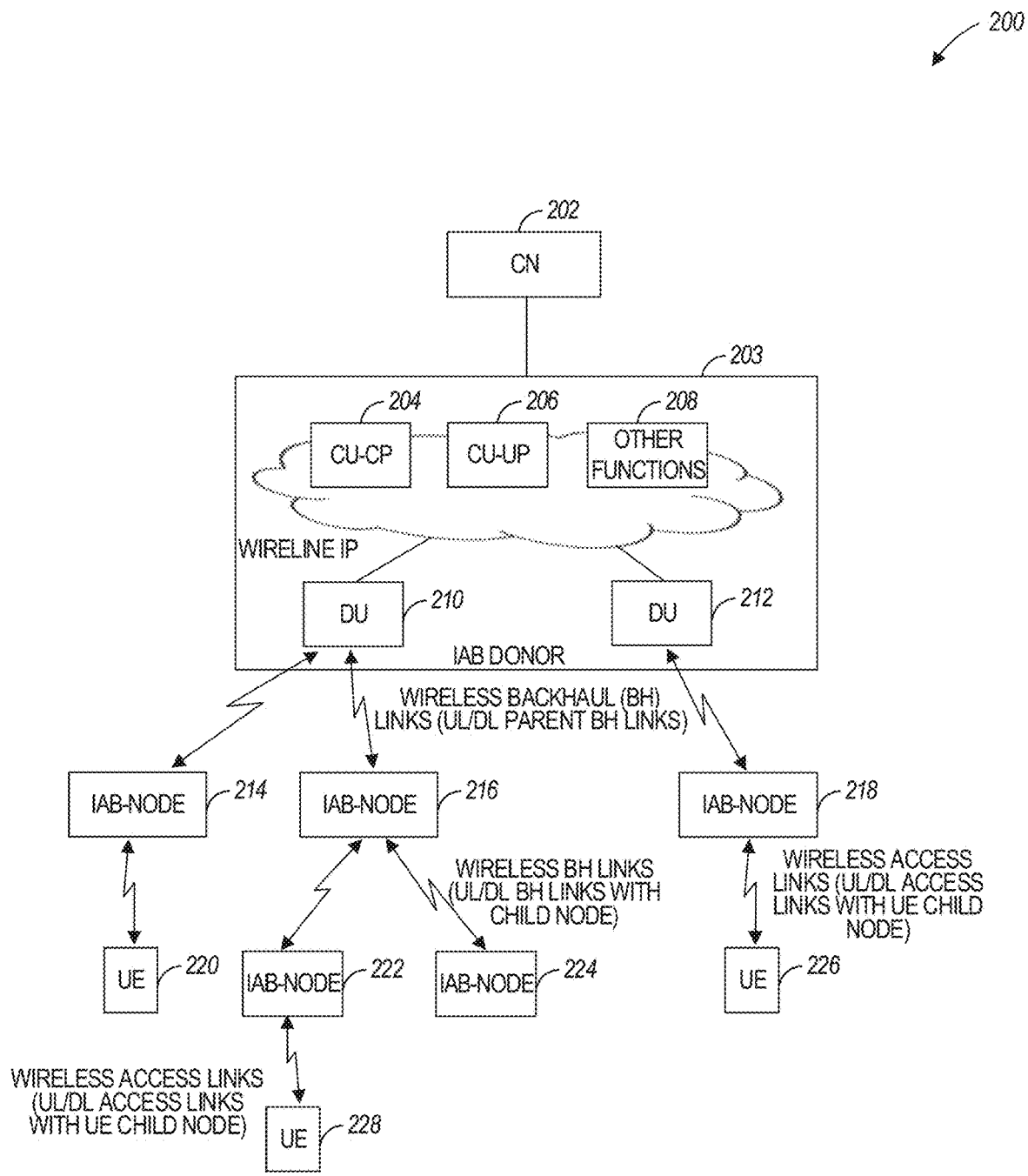
FIG. 2 illustrates a reference diagram of an IAB architecture, in accordance with some aspects.
Figure 3:
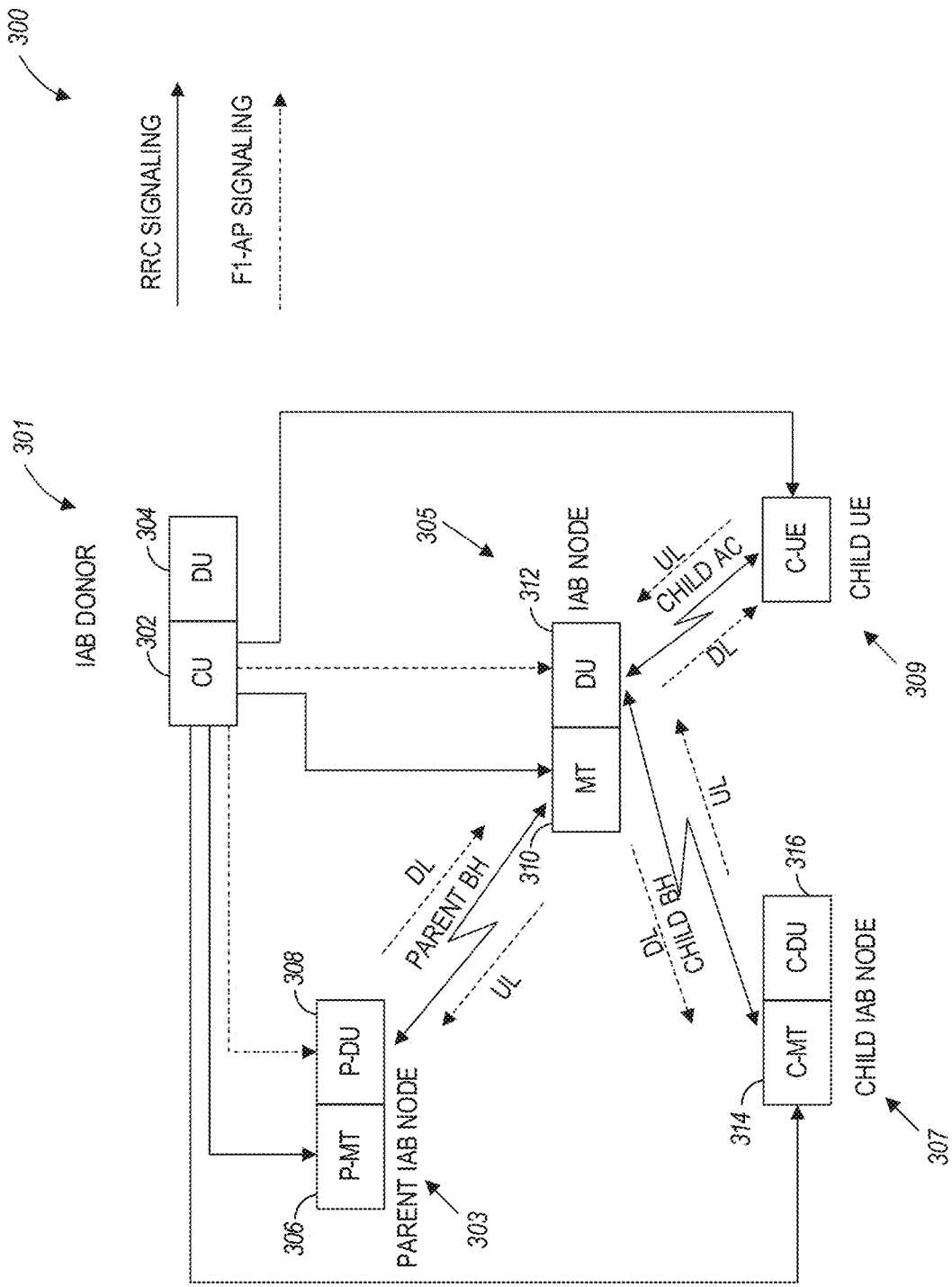
FIG. 3 illustrates a central unit (CU)—distributed unit (DU) split and signaling in an IAB architecture, in accordance with some aspects.

As illustrated in FIGS. 2-3, in an IAB network, an IAB node can connect to its parent node (an IAB donor or another IAB node) through a parent backhaul (BH) link, connect to a child user equipment (UE) through a child access (AC) link, and connect to a child IAB node through a child BH link.

FIG. 2 shows a reference diagram for IAB in a standalone mode, which contains one IAB donor node 203 and multiple IAB nodes (e.g., 214, 216, 218, 222, and 224). Referring to FIG. 2, the IAB architecture 200 can include a core network (CN) 202 coupled to an IAB donor node 203. The IAB donor node 203 can include control unit control plane (CU-CP) function 204, control unit user plane (CU-UP) function 206, other functions 208, and distributed unit (DU) functions 210 and 212. The DU function 210 can be coupled via wireless backhaul links to IAB nodes 214 and 216. The DU function 212 is coupled via a wireless backhaul link to IAB node 218. IAB node 214 is coupled to a UE 220 via a wireless access link, and IAB node 216 is coupled to IAB nodes 222 and 224. The IAB node 222 is coupled to UE 228 via a wireless access link. The IAB node 218 is coupled to UE 226 via a wireless access link.

Each of the IAB nodes illustrated in FIG. 2 can include a mobile termination (MT) function and a DU function. The MT function can be defined as a component of the mobile equipment and can be referred to as a function residing on an IAB-node that terminates the radio interface layers of the backhaul Uu interface toward the IAB-donor or other IAB-nodes.

The IAB donor 203 is treated as a single logical node that comprises a set of functions such as gNB-DU, gNB-CU-CP 204, gNB-CU-UP 206, and potentially other functions 208. In deployment, the IAB donor 203 can be split according to these functions, which can all be either collocated or non-collocated as allowed by 3GPP NG-RAN architecture. IAB-related aspects may arise when such a split is exercised. In some aspects, some of the functions presently associated with the IAB-donor may eventually be moved outside of the donor in case it becomes evident that they do not perform IAB-specific tasks.

FIG. 3 illustrates a central unit (CU)-distributed unit (DU) split and signaling in an IAB architecture 300, in accordance with some aspects. Referring to FIG. 3, the IAB architecture 300 includes an IAB donor 301, a parent IAB node 303, an IAB node 305, a child IAB node 307, and a child UE 309. The IAB donor 301 includes a CU function 302 and a DU function 304. The parent IAB node 303 includes a parent MT (P-MT) function 306 and a parent DU (P-DU) function 308. The IAB node 305 includes an MT function 310 and a DU function 312. The child IAB node 307 includes a child MT (C-MT) function 314 and a child DU (C-DU) function 316.

As illustrated in FIG. 3. RRC signaling can be used for communication between the CU function 302 of the IAB donor 301 and the MT functions 306, 310, and 314, as well as between the CU function 302 and the child UE (C-UE) 309.

Additionally, F1 access protocol (F1AP) signaling can be used for communication between the CU function 302 of the IAB donor 301 and the DU functions of the parent IAB node 303 and the IAB node 305.

As illustrated in FIGS. 2-3, multiple IAB nodes are connected to a donor node (DN) via a wireless backhaul. A DN or a parent IAB node needs to properly allocate resources for its child IAB node under the half-duplex constraint at the child IAB node. In some aspects, the time-frequency resource allocated to the parent link may be orthogonal to the time-frequency resource allocated to the child or access link.

In an IAB network, there may exist resource transition time misalignment for a co-located IAB DU/MT. In some aspects, a parent IAB node can be made aware of the number of guard symbols (Ng) the child IAB node would like the parent IAB node not to use (e.g., desired Ng) at the edge (beginning or end) of a slot when there is a transition between child MT and child DU. Separately or additionally, the child IAB node can be made aware of the number of guard symbols that the parent IAB node will provide (e.g., actual Ng). Disclosed techniques are used for generating Ng tables (including eight resource transition cases) for co-located IAB DU/MT resource transitions. More specifically, some disclosed aspects are associated with generating an Ng table with a given maximum cell radius of 10 km and sub-carrier spacing (SCS) of 15 kHz. Additional aspects are associated with generating other Ng tables.

In aspects, new signaling regarding IAB MT/DU resource transition guard symbols is used to fulfill the following two purposes: P1: Parent DU to be aware of Ng symbols that an IAB node desires ("desired Ng"); and P2: IAB node to be aware of Ng symbols that its parent DU applies ("actual Ng"). Disclosed techniques provide signaling contents, signaling mechanisms, and detailed signaling methods to fulfill these two purposes.

In some aspects, the following statements on time-domain resource allocation may be considered by the disclosed techniques:

From an MT point-of-view, the following time-domain resources can be indicated for the parent link as in NR Release-15 (D/U/F): Downlink time resource; Uplink time resource: and Flexible time resource.

From a DU point-of-view, the child link has the following types of time-domain resources (D/U/F/NA): Downlink time resource; Uplink time resource: Flexible time resource; and Not available (NA) time resources (not to be used for communication on the DU child links).

For each of the downlink, uplink, and flexible time-resource types of the DU child link, there are two kinds: hard and soft (H/S). Hard: The corresponding time resource is always available for the DU child link. Soft: The availability of the corresponding time resource for the DU child link is explicitly and/or implicitly controlled by the parent node.

In some aspects, for an IAB node, the co-located IAB DU and IAB MT functions have separate semi-static resource configuration from the CU function of the IAB donor node. In addition, the parent DU will conduct dynamical resource scheduling for the IAB MT, while the co-located IAB DU will conduct dynamic resource scheduling for the child links. Several factors may cause potential resource transition time misalignment for the co-located IAB DU/MT: transmission propagation delay for the IAB MT to receive from the parent DU (MT Rx); time advance (TA) is introduced for the IAB MT to transmit to the parent DU (MT Tx): and there exists switching time among any transition among DU Tx, DU Rx, MT Tx, and MT Rx.

In some aspects, in one IAB node, the co-located DU and MT functions may have assigned resource transition in the adjacent slots for the DU and MT to transmit (Tx) or receive (Rx). For example, if a resource is assigned for the IAB MT at slot n and a resource is assigned for the co-located IAB DU at slot n−1, the following four resource transition cases may apply:

Case A1: MT Rx at slot n→DU Tx at slot n+1;
Case A2: MT Rx at slot n→DU Rx at slot n+1;
Case A3: MT Tx at slot n→DU Tx at slot n+1; and
Case A4: MT Tx at slot n→DU Rx at slot n+1.

In the meantime, if a resource is assigned for the IAB DU at slot n and a resource is assigned for the co-located IAB MT at slot n+1, there will be the following four transition cases:

Case B1: DU Tx at slot n→MT Tx at slot n+1;
Case B2: DU Tx at slot n→MT Rx at slot n+1;
Case B3: DU Rx at slot n→MT Tx at slot n+1; and
Case B4: DU Rx at slot n→MT Rx at slot n+1.

Figure 4:
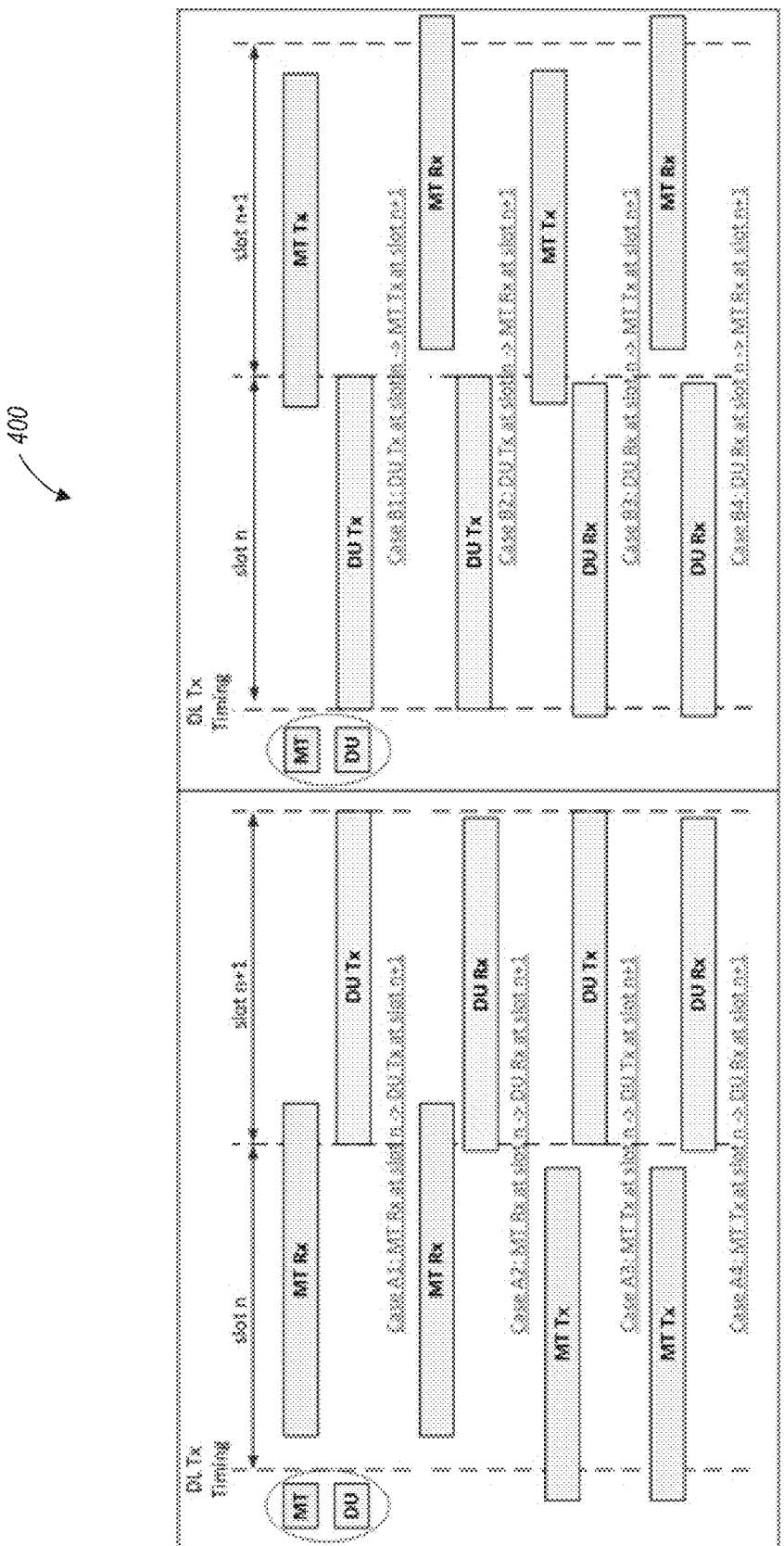
FIG. 4 illustrates example resource transitions at co-located MT/DU functions, in accordance with some aspects.

The above eight possible resource transitions are illustrated in FIG. 4. FIG. 4 illustrates diagram 400 of example resource transitions at co-located MT/DU functions, in accordance with some aspects. From FIG. 4 it may be observed that there exist overlapped resources that cause transmission/receiving conflict for co-located MT/DU functions. Hence, guard symbols (Ng) may need to be added at the edge (beginning or end) of a slot when there is a transition between co-located MT/DU.

For example, in Case A1, let $T_p$ denote the propagation delay between the parent node to the MT $T_{MTRx-DUTx}$ denote the switching time from MT Rx to DU Tx, and $T_d$ is the OFDM symbol duration, then the number of guard symbols $N_g$ can be calculated as $$N_g = \frac{T_{MTRx-DUTx} + T_p}{T_d}.$$

This $N_g$ guard symbols can be added at the end of the MT Rx or the beginning of the DU Tx.

In some aspects, the following functionalities may also be used in connection with disclosed techniques. A parent IAB node can be made aware of the number of symbols Ng the child IAB node would like the parent IAB node not to use at the edge (beginning or end) of a slot when there is a transition between child MT and child DU. Separately or additionally, the child IAB node can be made aware of the number of guard symbols that the parent IAB node will provide.

In some aspects, one or more guard symbols Ng can be provided for each of the possible transitions with potential overlap as illustrated in the following NG table (labeled as Table 1):

TABLE 1

| MT to DU | DL Tx | UL Rx |
|---|---|---|
| DL Rx | | |
| UL Tx | | |
| DU to MT | DL Rx | UL Tx |
| DL Tx | | |
| UL Rx | | |

In some aspects, if Ng is not provided, it is assumed to be 0.

Disclosed techniques relate to different methods to generate the above Ng tables for co-located IAB DU/MT resource transitions.

Methods to Generate Ng Tables for Co-located IAB DU/MT Resource Transitions

There are several factors related to Ng calculation and range:

(a) Transmission propagation delay $T_p$ from parent DU to the IAB MT (MT Rx);

(b) TA is applied for the IAB MT for UL transmission to the parent DU (MT Tx);

(c) There exists switching time between any transitions among DU Tx, DU Rx, MT Tx, and MT Rx; and (d) The OFDM symbol duration $T_d$.

To decide the value of the propagation delay $T_p$, one reference is the range of $N_{TA}*T_c$ where $N_{TA}*T_A \cdot 16*64/2^\mu$ and $T_A=0, 1, 2, \ldots, 3846$ as defined in TS38.213. However, the maximum $N_{TA}*T_c$ value can be up to 2 ms, which is in the level of slots and designed for large cell size. To derive Ng, we need to have a more reasonable assumption on the IAB cell range. In some aspects, one reasonable assumption is to use 10 km as a maximum inter-IAB node distance.

An example of IAB maximum cell radius of 10 km and SCS 15 kHz (with the OFDM symbol $T_d$=66.7 μs) scenario is provided herein. The one-way transmission propagation delay is $T_p \leq 33.3$ μs and in the [0,0.5] symbol range. The TA which is $(N_{TA}+N_{TA,offset})*T_c$ defined TS38.213 can be considered as $2*T_p+N_{TA,offset}*T_c$, where $N_{TA,offset}$ is defined in TS38.133 Table 7.1.2-2. Hence, the TA is in the [0,1.5] symbol range. In some aspects, $N_{TA,offset}*T_c$ is a reference for switching time between different transitions between DU/MT, which is 10.0.51 symbol range. In some aspects, the number of guard symbols (Ng) for the eight possible resource transitions are provided in the following Table 2.

TABLE 2

Ng calculation and range for IAB maximum cell radius 10 km and SCS 15 kHz.

| MT to DU | DL Tx | UL Rx |
|---|---|---|
| DL Rx | $N_g = \left\lceil \dfrac{T_{MTRx-DUTx} + T_p}{T_d} \right\rceil$ | $N_g = \left\lceil \dfrac{T_{MTRx-DURx} + T_{DURx-DUTx} + T_p}{T_d} \right\rceil$ |
| | Ng range: [1] | Ng range: [1, 2] |
| UL Tx | $N_g = \left\lceil \dfrac{T_{MTTx-DUTx} + T_p - TA}{T_d} \right\rceil$ | $N_g = \left\lceil \dfrac{T_{MTTx-DURx} + T_{DURx-DUTx} + T_p - TA}{T_d} \right\rceil$ |
| | Ng range: [0, 1] | Ng range: [0, 1] |
| DU to MT | DL Rx | UL Tx |
| DL Tx | $N_g = \left\lceil \dfrac{T_{DUTx-MTRx} - T_p}{T_d} \right\rceil$ | $N_g = \left\lceil \dfrac{T_{DUTx-MTTx} + TA - T_p}{T_d} \right\rceil$ |
| | Ng range: [0, 1] | Ng range: [1, 2] |
| UL Rx | $N_g = \left\lceil \dfrac{T_{DURx-MTRx} - T_{DURx-DUTx} + T_p}{T_d} \right\rceil$ | $N_g = \left\lceil \dfrac{T_{DURx-MTTx} - T_{DURx-DUTx} + TA - T_p}{T_d} \right\rceil$ |
| | Ng range: [0, 1] | Ng range: [1, 2] |

In some aspects, the value of Ng may depend on switching time, propagation delay $T_p$, and OFDM symbol duration $T_d$, which could have different values depending on carrier frequency and SCS. In some aspects, the following three methods to generate the Ng tables:

Method 1: Use a Single Ng Table for all Carrier Frequencies and SCSs.

In some aspects, the same switching time, $T_p$ value and $T_d$ value is used for all carrier frequency ranges and SCS values. For example, the $T_d$ value can be calculated based on a reference SCS (e.g., 15 kHz). Another possibility is to let switching time and $T_p$ value proportionally scale with respect to $T_d$, so that the Ng table can remain the same.

Method 2: Generate Two Tables for FR1 and FR2, Respectively.

In some aspects, switching time and $T_p$ can use different values for FR1 and FR2. In some aspects, different reference SCSs can be used for frequency range 1 (FR1) and FR2 to calculate the reference $T_d$ values (e.g., 15 kHz for FR1, 60 kHz for FR2).

Method 3: Generate Four tables for SCS={15 kHz, 30 kHz, 60 kHz, 120 kHz}, respectively.

In some aspects, switching time, $T_p$ value and $T_d$ value can be individually decided for each SCSs.

Figure 5:
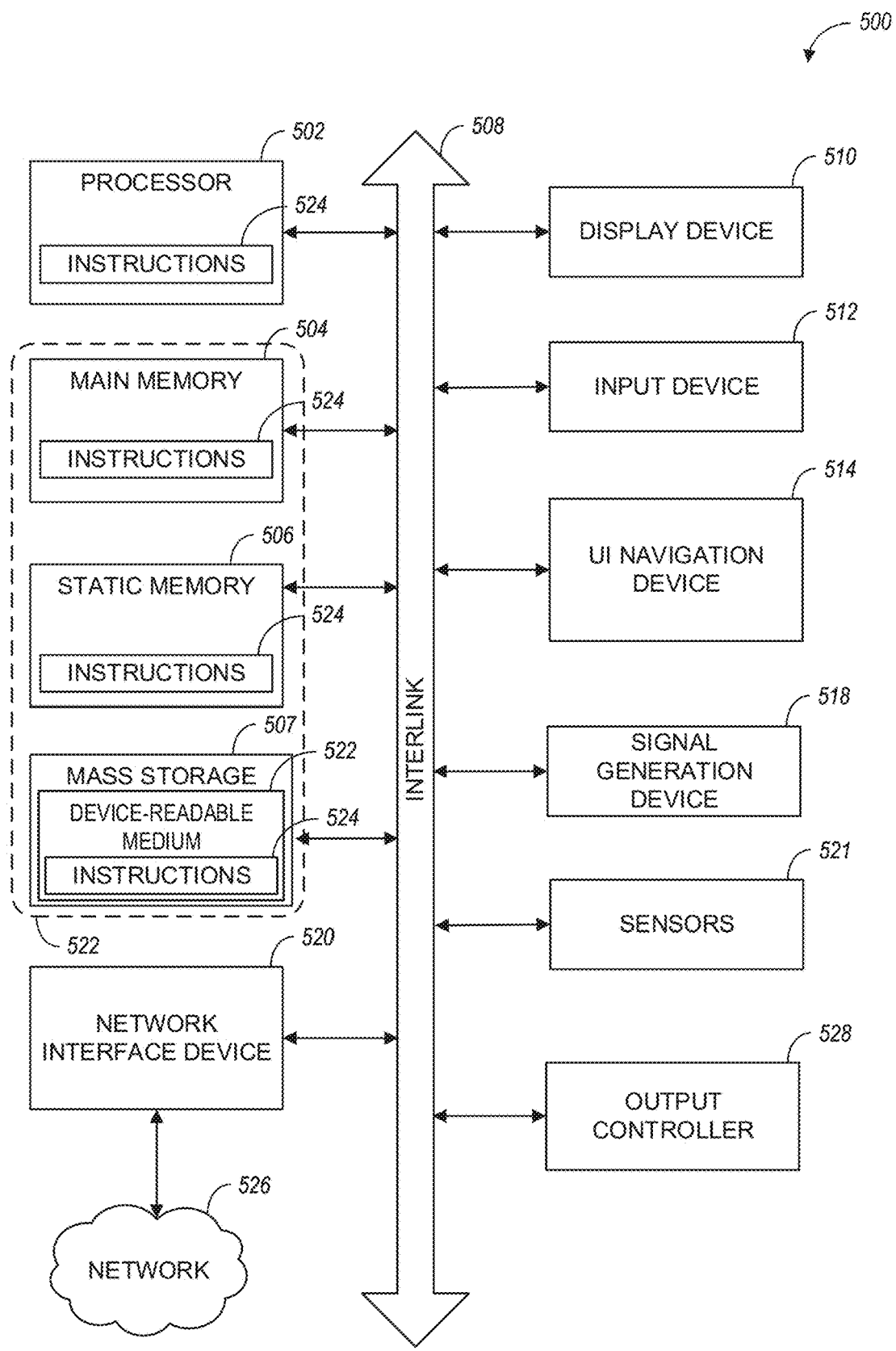
FIG. 5 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 5 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 500 may operate as a standalone device or may be connected (e.g., networked) to other communication devices.

Circuitry (e.g., processing circuitry) is a collection of circuits implemented in tangible entities of the device 500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. For example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 500 follow.

In some aspects, the device 500 may operate as a standalone device or may be connected (e.g., networked) to other devices. In a networked deployment, the communication device 500 may operate in the capacity of a server communication device, a client communication device, or both in server-client network environments. In an example, the communication device 500 may act as a peer communication device in a peer-to-peer (P2P) (or other distributed) network environment. The communication device 500 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. For example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 500 may include a hardware processor 502 (e.g., a central processing unit (CPU), a graphics processing unit (GPU), a hardware processor core, or any combination thereof), a main memory 504, a static memory 506, and a storage device 507 (e.g., hard drive, tape drive, flash storage, or other block or storage devices), some or all of which may communicate with each other via an interlink (e.g., bus) 508.

The communication device 500 may further include a display device 510, an alphanumeric input device 512 (e.g., a keyboard), and a user interface (UI) navigation device 514 (e.g., a mouse). In an example, the display device 510, input device 512, and UI navigation device 514 may be a touchscreen display. The communication device 500 may additionally include a signal generation device 518 (e.g., a speaker), a network interface device 520, and one or more sensors 521, such as a global positioning system (GPS) sensor, compass, accelerometer, or another sensor. The communication device 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 507 may include a communication device-readable medium 522, on which is stored one or more sets of data structures or instructions 524 (e.g., software) embodying or utilized by any one or more of the techniques or functions described herein. In some aspects, registers of the processor 502, the main memory 504, the static memory 506, and/or the storage device 507 may be, or include (completely or at least partially), the device-readable medium 522, on which is stored the one or more sets of data structures or instructions 524, embodying or utilized by any one or more of the techniques or functions described herein. In an example, one or any combination of the hardware processor 502, the main memory 504, the static memory 506, or the mass storage 516 may constitute the device-readable medium 522.

As used herein, the term "device-readable medium" is interchangeable with "computer-readable medium" or "machine-readable medium". While the communication device-readable medium 522 is illustrated as a single medium, the term "communication device-readable medium" may include a single medium or multiple media (e.g., a centralized or distributed database, and/or associated caches and servers) configured to store one or more instructions 524. The term "communication device-readable medium" is inclusive of the terms "machine-readable medium" or "computer-readable medium", and may include any medium that is capable of storing, encoding, or carrying instructions (e.g., instructions 524) for execution by the communication device 500 and that cause the communication device 50 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitor propagating signal.

The instructions 524 may further be transmitted or received over a communications network 526 using a transmission medium via the network interface device 520 utilizing any one of a number of transfer protocols. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input-multiple-output (SIMO), MIMO, or multiple-input-single-output (MISO) techniques. In some examples, the network interface device 520 may wirelessly communicate using Multiple User MIMO techniques.

The term "transmission medium" shall be taken to include any intangible medium that is capable of storing, encoding, or carrying instructions for execution by the communication device 500, and includes digital or analog communications signals or another intangible medium to facilitate communication of such software. In this regard, a transmission medium in the context of this disclosure is a device-readable medium.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to betaken in a limiting sense, and the scope of various aspects is defined only by the appended claims, along with the full range of equivalents to which such claims are entitled.

What is claimed is:

1. An apparatus for use in an Integrated Access and Backhaul (IAB) node, the apparatus comprising:
processing circuitry, wherein to configure the IAB node for switching between operation of co-located distributed unit (DU) function and mobile termination (MT) function of the IAB node, the processing circuitry is to:
decode control signaling from a DU function of a parent IAB node, the control signaling indicating a sub-carrier spacing (SCS) associated with one of frequency range 1 (FR1) and frequency range 2 (FR2) and indicating a plurality of guard symbol fields, each guard symbol field of the plurality of guard symbol fields indicating a number of guard symbols for a switching scenario of a plurality of switching scenarios for switching between the operation of the DU function and the NIT function of the IAB node; and
apply the number of guard symbols for the switching scenario during the switching between the operation of the DU function and the MT function of the IAB node; and
memory coupled to the processing circuitry and configured to store the control signaling.

2. The apparatus of claim 1, wherein for the FR1, the control signaling indicates a SCS of 15 kHz, wherein for the FR2, the control signaling indicates a SCS of 60 KHz, and wherein a guard spacing for the guard symbols is based on the SCS.

3. The apparatus of claim 1, wherein the plurality of switching scenarios include switching scenarios associated with switching operation from the MT function of the IAB node to the DU function of the IAB node.

4. The apparatus of claim 1, wherein the plurality of switching scenarios include switching scenarios associated with switching operation from the DU function of the IAB node to the MT function of the IAB node.

5. The apparatus of claim 1, wherein the processing circuitry is to:
determine a number of desired guard symbols for resource transitions associated with the plurality of switching scenarios based on a propagation delay between a DU function of the parent IAB node and the MT function of the IAB node, and based on orthogonal frequency division multiplexing (OFDM) symbol duration associated with the SCS; and
encode the number of desired guard symbols for transmission to the parent IAB node, the control signaling from the DU function based on the number of desired guard symbols.

6. The apparatus of claim 5, wherein the propagation delay is one of a first propagation delay associated with the FR1 and a second propagation delay associated with the FR2.

7. The apparatus of claim 6, wherein the SCS is one of a first SCS associated with the FR1 and a second SCS associated with the FR2.

8. The apparatus of claim 1, wherein the plurality of switching scenarios comprises:
reception of data by the MT function followed by transmission of other data by the DU function;
reception of the data by the MT function followed by reception of the other data by the DU function;
transmission of the data by the MT function followed by transmission of the other data by the DU function;
transmission of the data by the MT function followed by reception of the other data by the DU function;
transmission of the other data by the DU function followed by transmission of the data by the MT function;
transmission of the other data by the DU function followed by reception of the data by the MT function;
reception of the other data by the DU function followed by transmission of the data by the MT function; and
reception of the other data by the DU function followed by reception of the data by the MT function.

9. The apparatus of claim 1, wherein the control signaling is layer 1 (L1)/layer 2 (L2) signaling including a medium access control (MAC) control element (CE) communicated on a physical downlink shared channel (PDSCH).

10. An apparatus for use in a parent Integrated Access and Backhaul (IAB) node, the apparatus comprising:
processing circuitry, wherein to configure a child IAB node for switching between operation of co-located distributed unit (DU) function and mobile termination (MT) function of the child IAB node, the processing circuitry is to:
encode control signaling for transmission from a DU function of the parent IAB node to the MT function of the child IAB node, the control signaling indicating a sub-carrier spacing (SCS) associated with one of frequency range 1 (FR1) and frequency range 2 (FR2) and indicating a plurality of guard symbol fields, each guard symbol field of the plurality of guard symbol fields indicating a number of guard symbols for a switching scenario of a plurality of switching scenarios for switching between the operation of the DU function and the MT function of the child IAB node; and
apply the number of guard symbols for the switching scenario during the switching; and
memory coupled to the processing circuitry and configured to store the control signaling.

11. The apparatus of claim 10, wherein for the FR1, the control signaling indicates a SCS of 15 kHz, wherein for the FR2, the control signaling indicates a SCS of 60 KHz and wherein a guard spacing for the guard symbols is based on the SCS.

12. The apparatus of claim 10, wherein the plurality of switching scenarios include switching scenarios associated with switching operation from the MT function of the IAB node to the DU function of the IAB node.

13. The apparatus of claim 10, wherein the plurality of switching scenarios include switching scenarios associated with switching operation from the DU function of the IAB node to the MT function of the IAB node.

14. A non-transitory computer-readable storage medium that stores instructions for execution by one or more processors of an Integrated Access and Backhaul (IAB) node, the instructions to configure the IAB node for switching between operation of co-located distributed unit (DU) function and mobile termination (MT) function of the IAB node within an IAB network, and to cause the IAB node to:
decode control signaling from a DL function of a parent LAB node, the control signaling indicating a sub-carrier spacing (SCS) associated with one of frequency range 1 (FR1) and frequency range 2 (FR2) and indicating a plurality of guard symbol fields, each guard symbol field of the plurality of guard symbol fields indicating a number of guard symbols for a switching scenario of a plurality of switching scenarios for switching between the operation of the DU function and the MT function of the IAB node; and apply the number of guard symbols for the switching scenario during the switching between the operation of the DU function and the MT function of the IAB node.

15. The non-transitory computer-readable storage medium of claim 14, wherein for the FR1, the control signaling indicates a SCS of 15 kHz, wherein for the FR2, the control signaling indicates a SCS of 60 KHz, and wherein a guard spacing for the guard symbols is based on the SCS.

16. The non-transitory computer-readable storage medium of claim 14, wherein the plurality of switching scenarios include switching scenarios associated with switching operation from the MT function of the IAB node to the DU function of the IAB node.

17. The non-transitory computer-readable storage medium of claim 14, wherein the plurality of switching scenarios include switching scenarios associated with switching operation from the function of the IAB node to the MT function of the IAB node.

18. The non-transitory computer-readable storage medium of claim 14, wherein the IAB node is to:
   determine a number of desired guard symbols for resource transitions associated with the plurality of switching scenarios based on a propagation delay between a DU function of the parent IAB node and the MT function of the IAB node, and based on orthogonal frequency, division multiplexing (OFDM) symbol duration associated with the SCS; and
   encode the number of desired guard symbols for transmission to the parent IAB node, the control signaling from the DL function based on the number of desired guard symbols.

19. The non-transitory computer-readable storage medium of claim 18, wherein the propagation delay is one of a first propagation delay associated with the FR1 and a second propagation delay associated with the FR2.

20. The non-transitory computer-readable storage medium of claim 14, wherein the control signaling is layer 1 (L1)/layer 2 (L2) signaling including a medium access control (MAC) control element (CE) communicated on a physical downlin.

* * * * *